(No Model.)
R. WREDEN.
SHEARS.
No. 467,025.    Patented Jan. 12, 1892.
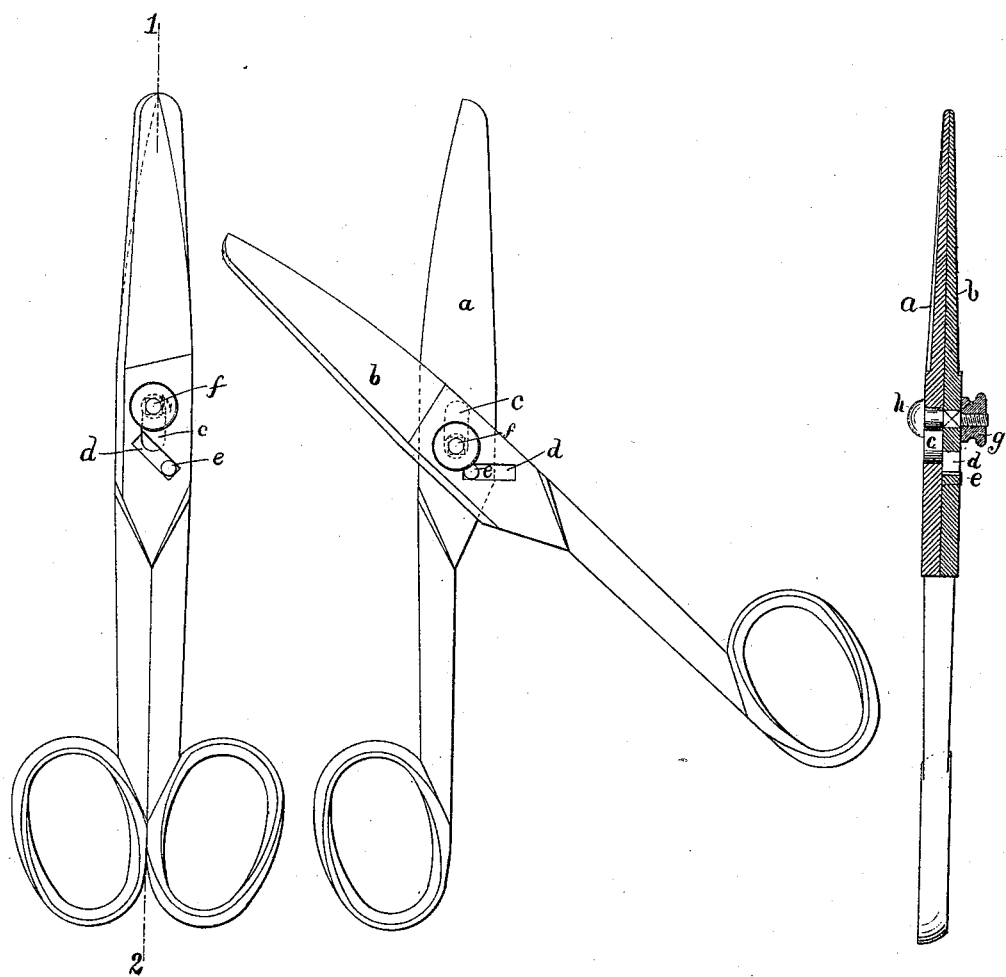
WITNESSES:
John Revell
George Baumann
INVENTOR
Robert Wreden
BY
Howson and Howson
his ATTORNEYS

UNITED STATES PATENT OFFICE.

ROBERT WREDEN, OF ST. PETERSBURG, RUSSIA.

SHEARS.

SPECIFICATION forming part of Letters Patent No. 467,025, dated January 12, 1892.

Application filed January 7, 1891. Serial No. 376,996. (No model.)

*To all whom it may concern:*

Be it known that I, ROBERT WREDEN, doctor of medicine, a subject of the Emperor of Russia, residing at St. Petersburg, Russia, have invented certain new and useful Improvements in Shears and Scissors, of which the following is a specification.

My invention relates to an improved arrangement of shears and scissors, being designed for the purpose of facilitating the cutting through of thick layers or pieces of cloth, leather, and other similar material. The effect proposed is obtained by giving to each of the blades (acting as levers of the first kind) a variable fulcrum that changes its position when using the shears in such a manner that the arm of the lever whereon acts the power of the fingers grows in the proportion as the shears are shut up. Another feature of these shears is that they can be easily undone, (dismounted,) which facilitates their cleansing and sharpening.

Referring to the drawings, Figure 1 shows the shears when shut up, and Fig. 2 when opened, while Fig. 3 is a longitudinal section of the shears on the line 1 2 in Fig. 1.

As represented on the drawings, each blade $a$ and $b$ is provided at the fastening with a slot $c$ and $d$, the slot $c$ on the blade $a$ having a straight longitudinal direction, while the slot $d$ on the blade $b$ is inclined and in such a manner that when the shears are opened, Fig. 2, the slot $d$ appears to be almost perpendicular to the slot $a$.

In the slot $d$ is sliding a small pin $e$, solidly attached (riveted) to the blade $a$ of the shears. In the slot $c$ is placed the bolt $f$, the cylindrical part of which moves in the slot $c$, the square part of the bolt $f$ being inserted in the square opening (hole) of the blade $b$ of the shears. The end of the bolt $f$ is threaded and a nut $g$ is screwed thereon that joins both the blades of the shears. On the other (opposite) end of the bolt $f$ is a semi-spherical head $h$, overlapping the slot $c$ and firmly holding in its place the blade $a$ of the shears.

The shape and size, as also the constructive details of the shears, may be modified as convenient. For instance, for some surgical purposes it would prove useful to make the cutting-edges curvilinear, arcuate, &c.

The action of the aforesaid fastening is as follows: When the shears are open, Fig. 2, the bolt $f$ is placed in the lower (the nearest to the centrum) end of the slot $c$. Then as the shears are shut up the pin $e$, traveling in the slot $d$, causes the blade $b$ to slide on the blade $a$ of the shears, whereby the bolt $f$ approaches the upper end of the slot $c$. It is easy to understand that the fulcrum of both the blades, acting as levers of the first kind, changes its position, and so that the arms of the levers, whereon acts the power of the fingers, gradually grow longer as the shears are shut. By these means the proposed shears are allowed to cut through without any difficulty even many layers of cloth or of leather, &c.

I claim as my invention—

An improved shears or scissors consisting of the combination of a pair of blades, one having a longitudinal slot and a pin projecting into and moving in an inclined slot in the opposite blade and a bolt passing through the said longitudinal slot, whereby the blades are held together and move on a variable fulcrum, substantially as and for the purpose described.

In testimony whereof I have signed my name to this specification in the presence of two subscribing witnesses.

ROBERT WREDEN.

Witnesses:
 JOHN C. CUMMING,
 J. F. NUBER.